US009019541B2

(12) United States Patent
Shen et al.

(10) Patent No.: US 9,019,541 B2
(45) Date of Patent: Apr. 28, 2015

(54) DEVICE AND METHOD FOR SYNCHRONIZATION IN DIGITAL PRINTING

(71) Applicants: Peking University Founder Group Co., Ltd., Beijing (CN); Peking University, Beijing (CN); Beijing Founder Electronics Co., Ltd., Beijing (CN)

(72) Inventors: Hong Shen, Beijing (CN); Lu Xue, Beijing (CN); Feng Chen, Beijing (CN)

(73) Assignees: Peking University Founder Group Co., Ltd., Beijing (CN); Peking University, Beijing (CN); Beijing Founder Electronics Co., Ltd., Beijing (CN)

( * ) Notice: Subject to any disclaimer, the term of this patent is extended or adjusted under 35 U.S.C. 154(b) by 0 days.

(21) Appl. No.: 14/122,951

(22) PCT Filed: Dec. 31, 2012

(86) PCT No.: PCT/CN2012/088085
§ 371 (c)(1),
(2) Date: Nov. 27, 2013

(87) PCT Pub. No.: WO2013/097822
PCT Pub. Date: Jul. 4, 2013

(65) Prior Publication Data
US 2014/0307289 A1    Oct. 16, 2014

(30) Foreign Application Priority Data
Dec. 31, 2011    (CN) .......................... 2011 1 0460194

(51) Int. Cl.
G06F 15/00     (2006.01)
G06K 1/00      (2006.01)
G06F 3/12      (2006.01)
G06K 15/02     (2006.01)

(52) U.S. Cl.
CPC ........ *G06K 15/1807* (2013.01); *G06K 15/1898* (2013.01)

(58) Field of Classification Search
None
See application file for complete search history.

(56) References Cited

U.S. PATENT DOCUMENTS

2002/0062487 A1*   5/2002   Ohno et al. ................... 725/133
2005/0007629 A1*   1/2005   Schuppan ................... 358/1.15

(Continued)

FOREIGN PATENT DOCUMENTS

CN    101007471 A    8/2007
CN    202480563 U   10/2012
JP     2008-9207 A    1/2008

OTHER PUBLICATIONS

International Search Report dated Apr. 11, 2013 from International Patent Application No. PCT/CN2012/088085 filed Dec. 31, 2012.

*Primary Examiner* — Ming Hon
(74) *Attorney, Agent, or Firm* — Workman Nydegger

(57) ABSTRACT

The present invention provides a digital inkjet printing synchronous control device, which comprises: a storage unit, for storing data of various colored surfaces; a control unit, for controlling an interactive processing unit to perform data receiving, storage and sending as well as generation of a printing trigger signal; and the interactive processing unit, under the control of the control unit, for receiving from a front-end system of a digital inkjet printing apparatus the data of the colored surfaces, storing the received data into the storage unit, sending the stored data to a back-end system of the digital inkjet printing apparatus, generating, according to a signal from a peripheral encoder and/or color code sensor of the digital inkjet printing apparatus, printing trigger signals of the colored surfaces, and sending the printing trigger signals to the back-end system of the digital inkjet printing apparatus. Correspondingly, the present invention provides a digital inkjet printing synchronous control method. Therefore, continuous printing of pages having different sizes and multiple colored surfaces can be implemented.

10 Claims, 3 Drawing Sheets

(56) References Cited

U.S. PATENT DOCUMENTS

| | | | |
|---|---|---|---|
| 2006/0082797 A1* | 4/2006 | Gardner | 358/1.8 |
| 2006/0092437 A1* | 5/2006 | Martin | 358/1.8 |
| 2010/0127777 A1 | 5/2010 | Yoshino et al. | |

* cited by examiner

DEVICE AND METHOD FOR SYNCHRONIZATION IN DIGITAL PRINTING

The present application is a US National Stage of International Application No. PCT/CN2012/088085, filed 31 Dec. 2012, designating the United States, and claiming priority of China patent application No. 201110460194.X, filed with the China Patent Office on Dec. 31, 2011, entitled "Digital Printing Synchronous Control Device and Control Method Thereof", both of which are incorporated herein by reference in its entirety.

FIELD OF THE INVENTION

The present invention relates to the technical field of digital printing, particularly to a device and method for synchronization control in digital printing.

BACKGROUND OF THE INVENTION

The digital printing technology is a noncontact printing technology developing rapidly in recent years, and is featured by directly processing, transmitting and printing image data. Noncontact printing is so called because a drop-on-demand inkjet printing nozzle is adopted in digital printing, a series of tiny channels are formed in the nozzle, ink is squeezed out of these tiny channels through mechanical effect produced by a piezoelectric crystal, directly jetted to a predefined position on the surface of a printing substrate for imaging, and the distance between the nozzle and the surface of the printing substrate is generally kept at about 1 millimeter. Compared with a traditional printing mode, the digital printing technology saves processes of plate-making and the like, is short in printing cycle and high in efficiency, and particularly, has a simple and efficient solution for printing tasks with high printing complexity such as variable data and color gradient images.

The digital printing technology supports printing of multiple color images based on four colors of CMYK (namely cyan, magenta, yellow and black), the color images are formed by dot matrixes of different gray levels of the four CMYK colors, and for a printing process, a different number of ink droplets with different sizes are mixed to form images. The quantity of the ink droplets depends on transmitted data, which is just the characteristic of the digital technology. For multi-color printing, hardware systems of all panes can not be installed on the same physical position, but have certain physical distances, so inevitably, there is an overprinting problem among a plurality of panes, and this problem is called as a synchronous problem among the panes.

So-called synchronization means to ensure that a plurality of panes of the same page are printed on the same position of a printing substrate, thus forming a page of complete image. For alignment of the position, two dimensions of an X direction and a Y direction need to be covered. This needs to effectively control the transmitting moment and the printing moment of data on all panes, so that the pane data printed at different moments can be printed on the same position of the printing substrate.

In the existing digital printing technology, in one-time production process, namely in the printing process of a job, the sizes of pages of the printed job are the same. Even mass production, namely, production of pages with the same size and in a huger number, basically involves a one-time production process. In this case, synchronization among a plurality of panes only needs one-time overprinting. In terms of the concept of overprinting, it needs to find a solution to ensure that a plurality of panes of the same page is printed together. In traditional printing, some models need adjustment of the length of a plate cylinder, and some models need manual adjustment of the physical position of each pane. In the existing digital printing technology, similarly, different models need different overprinting methods, namely the physical position of each pane is manually adjusted, or the physical position is fixed and registration of following panes and preceding panes is ensured through delay of time.

However, with the increase of customer demands, not only is large-order production needed, but also small-order customers need to be dealt with. Printed products of the small-order customers fall into many categories and are inconsistent in page size, and the quantity of each order is small, and printing in this case is commonly known as short-run live printing. However, according to the existing digital printing mode, only one job with same page size can be printed at a time, and for jobs with different page sizes, overprinting and machine adjustment need to be conducted again, so that the production efficiency is inevitably reduced, and the proportion of cost of media (namely, printing substrates) required for overprinting and machine adjustment in the total cost is inevitably increased.

SUMMARY OF THE INVENTION

In order to solve the above-mentioned problems, the present invention provides a device and method for synchronization control in digital printing to achieve continuous printing of pages with different sizes and multiple panes.

In order to achieve the above objective, the device for synchronization control in digital printing provided in the present invention includes: a storage unit, configured to store data of each pane; a control unit, configured to control an interactive processing unit to execute reception, storage and transmission of the data and generation of print triggering signals; and the interactive processing unit, configured to, under the control of the control unit, receive the data of each pane from a front-end system of digital printing equipment, store the received data in the storage unit, transmit the stored data to a rear-end system of the digital printing equipment, generate the print triggering signal of each pane according to signals of an encoder and/or a color mark sensor as peripheral device of the digital printing equipment and transmit the print triggering signals to the rear-end system of the digital printing equipment.

Correspondingly, the present invention provides a method for synchronization control in digital printing, including: analyzing print commands, pane parameters, equipment parameters and print job parameters received from a front-end system of digital printing equipment, wherein the print commands include a print start command and a print cancel command, the pane parameters include a physical distance of each pane from the 1st pane, the equipment parameters include a maximal printing effective width of the digital printing equipment, and the print job parameters include the quantity of panes required to be configured in a print job, the length, the width and the number of pages of the print job, the page distance in a single job and the distance between print jobs; in response to the print start command, allocating a storage space for each pane according to the quantity of panes; when detecting that the storage space allocated for each pane is idle enough, receiving data of each pane from the front-end system page by page and storing the data in the corresponding storage space; when detecting that a page of complete data is stored, determining a start moment and an end moment of transmitting the data of each pane of the page according to the analyzed print job parameters and equipment parameter, and transmitting the stored data of each pane of the page to a rear-end system of the digital printing equipment according to the determined start moment and end moment; and after it is detected that a page of data has been transmitted to the rear-end system, generating a print triggering signal of each pane according to signals of an encoder and/or a color mark sensor as peripheral device of the digital printing equipment and the analyzed print job parameters, equipment parameter and pane parameters, and transmitting the print triggering signals to the rear-end system of the digital printing equipment.

The present invention provides a control device and method applicable to continuous printing of pages with different sizes and multiple panes, for the digital printing equipment. The device and the method are simple and easy to implement, do not need overprinting and machine adjustment again, thus adapt to the needs derived from short live printing, effectively expand the application field of the digital printing technology, improve the production efficiency of digital printing and reduce the waste of production media.

DETAILED DESCRIPTION OF THE EMBODIMENTS

Figure 1:
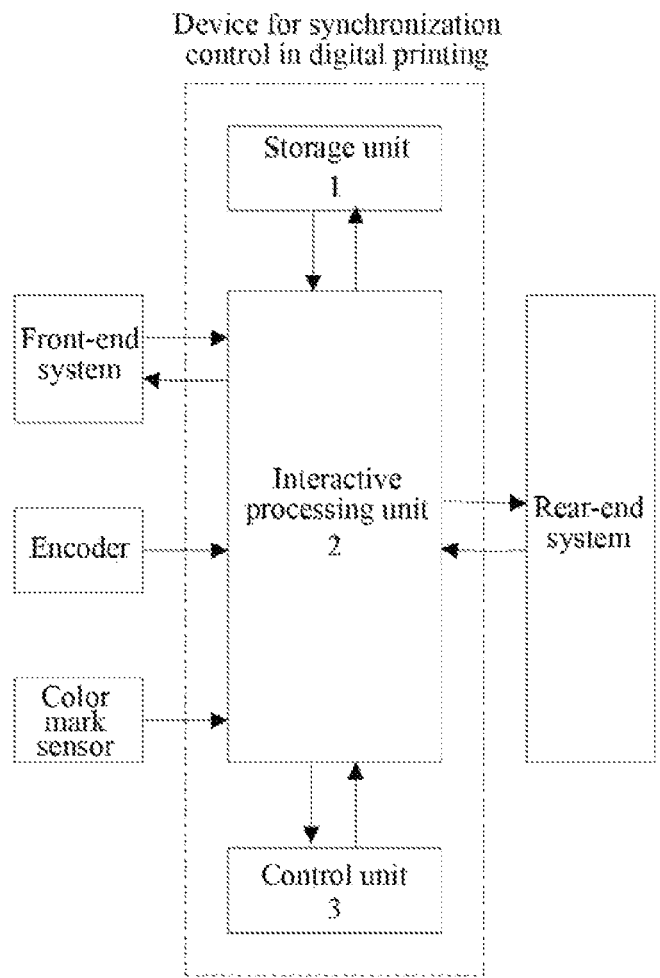
FIG. 1 is a schematic structure diagram of a device for synchronization control in digital printing applied to digital printing equipment according to the present invention.

The present invention will be described in detail below with reference to accompanying drawings and embodiments.

In existing digital printing equipment, generally a front-end system (namely, upper software) of the digital printing equipment completes processing of image dot matrix data of a print job, divides a page of image into data of four CMYK panes, and then transmits the data successively, one color surface after another, to a rear-end system (namely, a print control part, including a nozzle component) of the digital printing equipment for printing. Herein, the front-end system provides a user operation interface, and through this interface, parameters such as pane parameters and equipment parameters may be configured, a print job (including print job parameters) may be submitted, and commands of print start, print cancel and the like may be input, wherein the pane parameters include a physical distance of each pane from the 1st pane, the equipment parameters include a maximal printing effective width of the digital printing equipment, and the print job parameters include the quantity of panes required to be configured in a print job, the length, the width and the number of pages of the print job, the page distance in a single job, the distance between print jobs and the like.

Dot matrix data of a page of image may be regarded as consisting of a plurality of lines in a Y direction, named as one line data; and the one line data may also be regarded as consisting of a plurality of dots in an X direction, named as a unit point. Then, it could be simply understood that the width of a page of image is a product of the number of the dots in the X direction and the diameter of a unit point, the length of a page of image is a product of the number of the lines in the Y direction and the diameter of a unit point, and the diameter of this unit point depends on the size of a point that can be jet by the digital printing equipment. Due to digital printing, the gray level of each unit point is finally represented by a digit. For example, if the gray level of a unit point is 5, the data of this point processed in transmission process is 5. The physical distance of each pane from the 1st pane, the page distance and the distance between the print jobs may be converted into a line number.

Moreover, the digital printing equipment is also generally provided with some peripheral equipment, such as an encoder and a color mark sensor. Through signals of the encoder, a continuous printing mode may be realized. So-called continuous printing means that the next page is continued to be printed after the digital printing equipment prints a page and goes through the page distance required by a user. Through the signals of the encoder and color mark signals of the color mark sensor, a color mark printing mode may be realized. So-called color mark printing means that a page is printed after the digital printing equipment scans an effective color mark, then coming of next color mark is waited and printing is performed.

The encoder provides encoder signals, the so-called encoder signals are pulse signals generated in the process that the encoder rotates one circle along with a mechanical bearing, the numbers of pulses generated in the course that different encoders rotate one circle are different, and effective levels and pulse durations may also be different. The encoder signals are unit triggering signals for printing one line data by the digital printing equipment, and after the rear-end system receives one or more effective encoder signals, the printing process of the one line data is completed. For example, suppose printing of the one line data is accomplished through triggering by 3 effective encoder signals, then if the page length of a page of image is j millimeters, the page length is converted into k lines, and printing of the k lines needs triggering by 3k encoder signals.

The color mark sensor provides color mark signals, the so-called color mark signals are pulse signals generated after the color mark sensor acquires color marks on a printing substrate, and effective levels and pulse durations of the pulse signals of different color mark sensors may also be different. Printing of the digital printing equipment in the color mark mode is based on the color mark signals, namely, once an effective color mark signal is received, it is considered that printing of a new page is needed.

FIG. 1 is a schematic diagram of a device for synchronization control in digital printing applied to digital printing equipment according to the present invention. The objective of the device for synchronization control in digital printing according to the present invention is to effectively control the transmission moment and the printing moment of data of each pane, so that the pane data of the same page printed at different moments may be printed at the same position of a printing substrate, and pages with the same size or different sizes may be continuously printed on the printing substrate.

As shown in FIG. 1, the device for synchronization control in digital printing according to the present invention includes a storage unit 1, an interactive processing unit 2 and a control unit 3, wherein the storage unit 1 is configured to store data of each pane; the interactive processing unit 2 is configured to, under the control of the control unit 3, receive the data of each pane from a front-end system of digital printing equipment, store the received data in the storage unit 1, transmit the stored data to a rear-end system of the digital printing equipment, generate print triggering signals of each pane according to signals of an encoder and/or a color mark sensor as peripheral device of the digital printing equipment and transmit the print triggering signals to the rear-end system of the digital printing equipment; and the control unit 3 is configured to control the interactive processing unit 2 to execute the steps of reception, storage and transmission of the data and generation of the print triggering signals. The rear-end system performs continuous printing according to the received print triggering signals and pane data.

Specifically, the control unit 3 has the functions of: (1) analyzing and transmitting a plurality of parameters, including print job parameters (including the quantity of panes required to be configured in a print job, the length, the width and the number of pages of the print job, the page distance in a single job and the distance between print jobs), pane parameters (including the physical distance among a plurality of panes) and the like; (2) allocating the storage space of each pane in the storage unit 1 according to the number of the panes; and (3) continually querying or detecting the storage state of the storage unit 1, the working state (including query of data reception, storage and transmission states) of the interactive processing unit 2 and the printing state of the rear-end system, and guiding the interactive processing unit 2 to act, including when reception and transmission of data are started, when generation of page detect (PD) signals and the like is started, and a printing state is fed back to the front-end system.

The interactive processing unit 2 has the functions of: (1) providing physical interfaces with the front-end system, the rear-end system and peripheral equipment (including the encoder and/or the color mark sensor) of the digital printing equipment to receive print commands, pane parameters, equipment parameters, printing job parameters and data of each pane from the front-end system, receiving encoder signals and/or color mark signals from the encoder and/or the color mark sensor, and transmitting the data of each pane and the generated print triggering signals to the rear-end system; (2) interacting with the control unit 3, receiving the analyzed parameters and operation instructions from the control unit 3 and returning a working state to the control unit 3 at the same time; and (3) executing specific operations, including receiving the data from the front-end system, storing the data in the corresponding storage space, transmitting the data to the rear-end system, performing filtering and the like on encoder input signals and/or color mark signals, generating a print triggering command of each pane, performing timing control on read-write operation of the storage unit, feeding the printing state back to the front-end system and the like.

The storage unit 1 is mainly configured to provide a large-capacity storage space for image dot matrix data of a print job. The capacity of the storage unit determines, to a certain extent, the maximal size of a page that can be printed. The bigger the size of the page is, the larger the included dot matrix data volume is, and the smaller the quantity of pages stored in the storage space with the same size is. If the principle that a page of complete data is stored and then transmitted to a rear end is adopted, after the storage space is divided equally according to the quantity of panes, the equal division value thereof is the permissible maximal data volume of dot matrix data of a single pane.

When the front-end system starts printing, the control unit 3 analyzes the parameters received from the front-end system through the interactive processing unit 2, and allocates the storage space in the storage unit 1 according to the analyzed pane quantity. For example, if four-color printing is analyzed, the storage space in the storage unit is averagely divided into four equal parts for data storage of four panes, and a start address and an end address of each part of storage space are transmitted to the interactive processing unit 2. When detecting that the storage space is idle enough, the control unit 3 starts the interactive processing unit 2 to receive dot matrix data of each pane of a page from the front-end system page by page and store the dot matrix data in the corresponding storage space. When the control unit 3 detects a page of complete dot matrix data in the storage space, the control unit 3 starts the interactive processing unit 2 to transmit the data of each pane of the page to the rear-end system. When detecting that a page of complete dot matrix data have been transmitted to the rear-end system, the control unit 3 starts the interactive processing unit 2 to generate a print triggering signal of each pane according to encoder signals and/or color mark signals, as a start signal for starting printing a page of each pane in the rear-end system. When learning that the rear-end system has finished printing of a page through query, the control unit 3 generates state information, and the state information is returned to the front-end system through the interactive processing unit 2. The steps of reception, storage and transmission of the data and generation of the print triggering signals are repeated to accomplish printing of continuous pages.

The main structure of a device for synchronization control in digital printing according to an embodiment of the present invention is described below with reference to FIG. 2.

In this embodiment, a virtual paper arrival mark signal (PD signal for short below) is set as a print triggering signal of each pane. When a certain pane receives a PD signal, it is considered that a piece of paper has arrived, and printing of this pane is needed, and then printing of this pane is started. The PD signals of all the panes are generated at different moments, thus, a plurality of panes of the same page may be printed at different moments, so that synchronization of a plurality of panes is realized. Therefore, the key of the embodiment of the present invention is when the PD signals transmitted to the panes are generated.

Moreover, in this embodiment, the device for synchronization control in digital printing of the present invention is implemented totally by hardware, specifically, the control unit 3 is implemented by a micro-control unit (MCU) circuit, the interactive processing unit 2 is implemented by a field programmable gate array (FPGA) circuit, and the storage unit 1 is implemented by a memory circuit. The FPGA itself may provide many registers and some small-space caches, but as contents of image data are generally huge, the large-capacity memory circuit 3 needs to be provided for storing the data of each pane.

Figure 2:
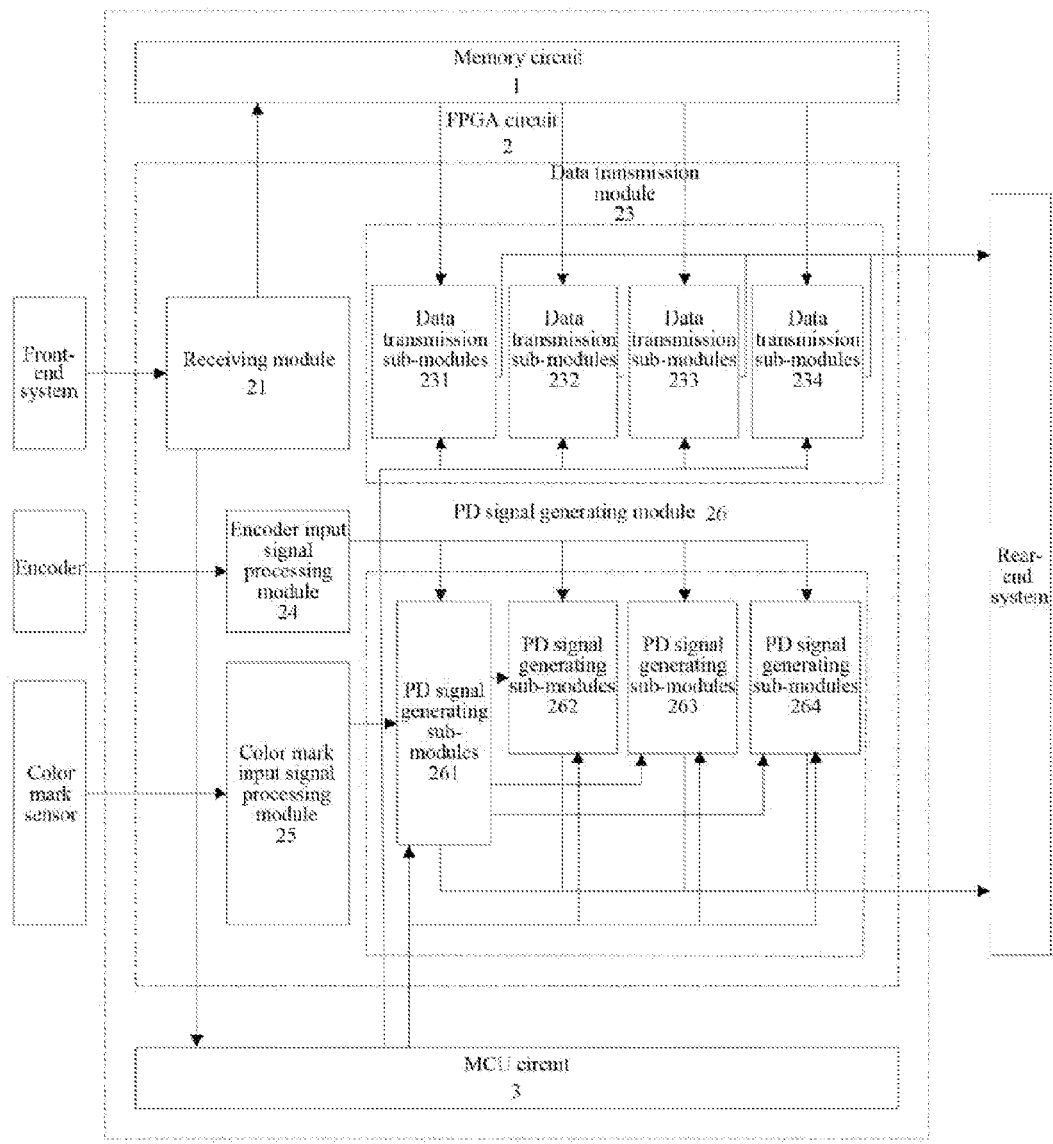
FIG. 2 is a detailed structure diagram of a device for synchronization control in digital printing according to an embodiment of the present invention.

As shown in FIG. 2, the FPGA circuit 2 mainly includes a receiving module 21, a data transmission module 23, an encoder input signal processing module 24 and/or a color mark input signal processing module 25 and a PD signal generating module 26.

In this case, the receiving module 21 is configured to receive print commands, pane parameters, equipment parameters and print job parameters from the front-end system and transmit the received commands and parameters to the MCU circuit 3 for analysis. When the MCU circuit 3 detects that the storage space allocated for each pane in the memory circuit 1 is idle enough, the receiving module 21 receives the data of each pane from the front-end system page by page, and stores the received data in the corresponding storage space of the memory circuit 3 according to timing control.

The data transmission module 23 is configured to, when the MCU circuit 3 detects that a page of complete data is stored in the memory circuit, determine a start moment and an end moment of transmitting the data of each pane of the page according to the print job parameters and the equipment parameter analyzed by the MCU circuit 3, and transmit the data of each pane of the page stored in the memory circuit to the rear-end system according to the determined start moment and end moment. In the data transmission process, as the total printable width (refer to the equipment parameter) of the digital printing equipment is determined by the physical property thereof, and the image width of a print job is different according to different production requirements, the processing of addition, reduction and the like of some dot matrixes is inevitably involved in the data transmission process. For example, if the image width is larger than the printable width of the equipment, part of the dot matrixes must be cut out in data transmission; and similarly, if the position of an image on the printing substrate needs to be moved, certain data gaps may have to be filled in data transmission. All these parameters related to data processing need to be received and stored by the data sensing module 23 (for example, stored in a register set in the data sensing module 23), and are effectively applied in the data transmission process. Moreover, in the case of multiple colors, when data transmission is started, a plurality of panes may be simultaneously started, or the panes are started in turn, with one pane being started at a time, so that competition on a bus read by the memory circuit 1 is avoided.

The encoder input signal processing module 24 is configured to perform filtration, frequency division and frequency multiplication on encoder signals input through an encoder. As the encoder signals are input signals provided by the external encoder, certain filtration processing must be performed in the FPGA to eliminate probable burrs in a hardware transmission process (the specific method is to sample and judge the signals for a certain period of time), so that the signals may be normally used. The number of pulses actually generated by the encoder may not just be the number of the encoder signals required by the digital printing equipment in the process that the encoder rotates one circle, so frequency division and frequency multiplication are needed to obtain effective encoder signals, the quantity of which meets the requirement, as effective signals available to the FPGA. For example, printing of one line data is accomplished through triggering by 3 effective encoder signals in time T, and a mechanical encoder shaft actually generates 5 signals in the time T, then 5 frequency division and 3 frequency multiplication are needed or 10 frequency division and 6 frequency multiplication are needed to generate 3 signals. The encoder signals obtained after filtration, frequency division and frequency multiplication, as effective encoder signals, are supplied to the PD signal generating module 26 and used as basic triggering units and statistical units of image printing lines and delay lines.

The color mark input signal processing module 25 is configured to filter color mark signals input through a color mark sensor. Similarly, in the digital printing equipment, the color mark signals are generally provided by the external color mark sensor; and after the FPGA filters the received color mark signals, the color mark signals may be normally used.

The print triggering signal generating module 26 is configured to, after the MCU circuit 3 detects that a page of data has been transmitted to the rear-end system, generate a print triggering signal of each pane according to the signals processed by the encoder input signal processing module 24 and/or the color mark input signal processing module 25 and the print job parameters, the equipment parameter and the pane parameters analyzed by the MCU circuit 3.

No matter in a continuous printing mode or a color mark printing mode, as long as the rear-end system receives a PD signal for a corresponding pane, printing of a page is started from the pane. Therefore, the key of the PD signal generating module 26 is how the PD signals of all the panes of the same page are generated to ensure that a plurality of panes may be printed at the same physical position of a printing substrate to form a complete color image.

As mentioned above, for multi-color printing, certain physical distances exist between the panes, and the physical distances may be converted to lines, then measured through recording the number of the encoder signals and delayed according to the recorded number of encoder signals to generate a PD signal of each pane. For example, suppose the moving direction of a piece of paper is from a 1st pane to a 2nd pane, then in the generation process of the PD signals, for generation of the PD signals of the same page, generation of the PD signals is certainly started from the 1st pane. Suppose printing of one line data is accomplished through triggering by 3 encoder signals, the physical distance between the 2nd pane and the 1st pane is m, which is converted to n lines, then the n lines must be delayed after the one line data is printed on the 1st pane, and then printing of the same line can be started on the 2nd pane, and the delay of n lines is accomplished through triggering by 3n encoder signals. That is to say, the number of the encoder signals is recorded from the generating moment of the PD signal of the 1st pane, and when the recorded number of the encoder signals is equal to 3n, generation of the PD signal of the 2nd pane is started. Other panes have similar delays corresponding thereto, to ensure multi-color overprinting alignment.

Therefore, for the continuous printing mode, the print triggering signal of each pane may be generated page by page according to the following steps: after the MCU circuit 3 detects that complete data of the current page has been transmitted to the rear-end system, generating the print triggering signal of the 1st pane; recording the number of the encoder signals from the generating moment of the print triggering signal of the 1st pane, and when the recorded number of the encoder signals corresponds to the physical distance of any of the remaining panes from the 1st pane, generating the print triggering signal of this pane; and recording the number of the encoder signals from the generating moment of the print triggering signal of each pane, and when the recorded number of the encoder signals corresponds to the sum of the page length and the page distance, executing the above-mentioned steps again to generate the print triggering signal of each pane of the next page.

For the color mark printing mode, the print triggering signal of each pane may be generated page by page according to the following steps: after the MCU circuit 3 detects that complete data of the current page has been transmitted to the rear-end system and the 1st effective color mark signal is received, generating the print triggering signal of the 1st pane; recording the number of the encoder signals from the generating moment of the print triggering signal of the 1st pane, and when the recorded number of encoder signals corresponds to the physical distance of any of the remaining panes from the 1st pane, generating the print triggering signal of this pane; and recording the number of the encoder signals from the generating moment of the print triggering signal of each pane, and when the recorded number of the encoder signals corresponds to the page length, executing the above-mentioned steps again to generate the print triggering signal of each pane of the next page. Herein, it is noted that the concept of page distance is not involved in the color mark printing mode.

As shown in FIG. 2, the PD signal generating module 26 includes 4 PD signal generating sub-modules 261-264, and the data transmission module 23 also includes 4 data transmission sub-modules 231-234. Such configuration is made so as to meet the design requirement of 4 colors at most, namely, to support printing synchronization of four CMYK colors at most. For the printing requirement of less than 4 colors (such as 1 color or 2 colors), less than 4 data transmission sub-modules and less than 4 PD signal generating sub-modules actually work in the FPGA. The difference between the continuous printing mode and the color mark printing mode lies in that the same encoder signal is simultaneously supplied to all the PD signal generating sub-modules for use, while a color mark sensor signal is first supplied to the 1st PD signal generating sub-module for use, processed by the PD signal generating sub-module 1 and then output to other several PD signal generating sub-modules for use. Relations among the plurality of data transmission sub-modules are parallel.

Moreover, the FPGA circuit 2 also includes a state feedback module (not shown), which returns the printing state of the rear-end system obtained by the MCU circuit 3 through query to the front-end system. When the MCU circuit 3 learns, through query, that the rear-end system has finished printing of a page, state information is generated and returned to the front-end system through the state feedback module.

The working process of the device for synchronization control in digital printing shown in FIG. 2 will be described below with reference FIG. 3, taking color digital printing equipment based on an XAAR1001 nozzle as an example.

Printing of one line data by the XAAR1001 nozzle needs 3 encoder signals as triggering signals. Thus, if the data of a page of image may be divided into 2,000 lines in the Y direction, totally 6,000 encoder signals serving as the triggering signals are needed.

Suppose printing of a multi-page job needs to be accomplished, this job has 100 pages, the page size of each page is 300 mm×500 mm, namely, the page width is 300 mm, the page length is 500 mm, the page size is converted to a unit of page dot matrix, there are 4,255 dots in the X direction (namely, the width direction, indicated by dots), and 7,092 lines in the Y direction (namely, the length direction, indicated by lines).

Figure 3:
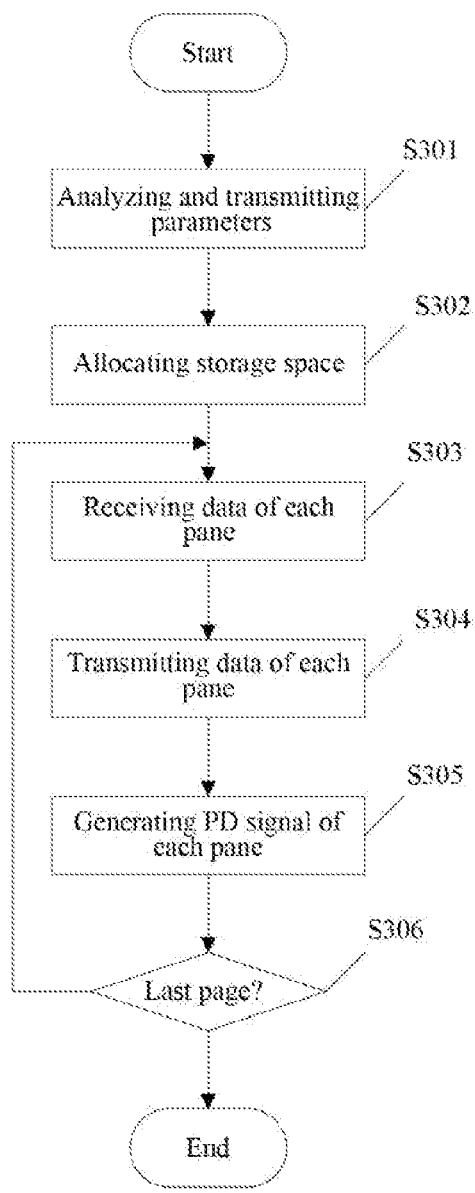
FIG. 3 is a flow diagram of a method for synchronization control in digital printing according to an embodiment of the present invention.

As shown in FIG. 3, firstly, in step S301, the MCU circuit 3 analyzes printing commands, pane parameters, equipment parameters and print job parameters (including page size parameters 4,255 and 7,092) received from the front-end system of the digital printing equipment, transmits the analyzed equipment parameter and print job parameters to the data transmission sub-module 231-234, and transmits the analyzed pane parameters (including the corresponding lines converted from the physical distances from the 2nd, 3rd and 4th panes to the 1st panes), equipment parameters and print job parameters (including the page size parameter 7,092) to the PD signal generating sub-modules 261-264. Herein, it should be noted that the data transmission module needs to know the size of the print job in the X direction and the Y direction, and the PD signal generating module only needs to know the size in the Y direction.

Next, in step S302, responding to a print start command, the MCU circuit 3 allocates storage space for each pane according to the quantity of panes required in actual printing. For example, suppose the memory circuit is configured with 512 MB, then for 4-color printing, 128 MB of storage space may be allocated for each pane. After completing allocation of the storage space, the MCU circuit 3 writes the start address and end address of the storage space corresponding to each pane into the register of the FPGA.

Next, in step S303, when detecting that the storage space allocated for each pane is idle enough, the MCU circuit 3 starts the receiving module 21 to receive the data of each pane from the front-end system page by page and store the data in the corresponding storage space.

Next, in step S304, when detecting that a page of complete data is stored, the MCU circuit 3 starts the data sensing sub-modules 231-234, determines the start moment and end moment of transmitting the data of each pane of the page according to the analyzed print job parameters and equipment parameter (specifically, determines the start moment and the end moment of transmitting the data in the X direction and Y direction according to the page length, the page width and the maximal printable width of the equipment), and transmits the stored data of each pane of the page to the rear-end system of the digital printing equipment according to the determined start moment and end moment.

Next, in step 305, when detecting that a page of data has been transmitted to the rear-end system, the MCU circuit 3 starts the PD signal generating module 26 to generate the print triggering signal of each pane according to the signals of the encoder and/or the color mark sensor as peripheral device of the digital printing equipment and the analyzed print job parameters, equipment parameters and pane parameters and transmit the print triggering signals to the rear-end system.

For example, suppose the physical distance of the 2nd pane from the 1st pane is 3,000 lines, and the printing mode is a continuous printing mode. As mentioned above, when the encoder rotates one circle along with a mechanical bearing, a plurality of pulse signals may be generated; after the pulse signals are input to the FPGA, the encoder input signal processing module 24 in the FPGA performs filtration of 1 µs for example; and the filtered (probably also frequency-divided or frequency-multiplied) signals, as effective encoder signals, are supplied to the PD signal generating sub-modules 261-264 and used as basic triggering units and statistical units of image printing lines and delay lines.

After the MCU circuit 3 detects that the complete data of the current page have been transmitted to the rear-end system, the PD signal generating sub-module 261 generates a print triggering signal of the 1st pane. Then, the number of encoder signals is recorded from the moment of generating the PD signal of the 1st pane, and when the recorded number of the encoder signals reaches 9,000 lines, namely, after 3,000 lines are delayed, the PD signal generating sub-module 262 generates the PD signal of the 2nd pane of the same page. Similarly, after delay for the 3rd pane and the 4th pane is also completed, the PD signal generating sub-modules 263 and 264 generate the PD signals of the 3rd pane and the 4th pane of the same page. After the rear-end system receives the PD signal of each pane, printing of each pane is performed, thus completing overprinting of a page of complete 4-color image. Moreover, after the PD signal of a page is generated for each pane, the number of the encoder signals is recorded from 0 till the calculated number of the encoder signals is equal to 3 times the page length of 7,092 lines, and printing of the page is considered to be completed at that time, then the page distance is gone through by recording the number of the encoder signals, then the PD signals of the next page are generated, and meanwhile, a counter for recording the number of the encoder signals is reset to restart recording. Through repetition in this way, printing of this 100-page job is completed.

In the color mark printing mode, after the color mark sensor acquires 1 color mark on the printing substrate, 1 pulse signal is generated and filtered through the color mark input signal processing module 25 in the FPGA to form an effective color mark signal, which is supplied to the PD signal generating sub-module 261. Herein, the processed color mark signal is merely transmitted to the PD signal generating sub-module 261 rather than being transmitted to all the PD signal generating sub-modules as for an encoder signal, because many color mark signals probably have been continuously printed on the printing substrate during one-time printing, and the data printing process in the color mark mode is actually combination of digital printing and one-time printing. In the working process of the digital printing equipment involved in the present invention, not every color mark signal on the printing substrate is used for triggering generation of a PD. In the present invention, when the rear-end system receives a PD, it is considered that a piece of paper has arrived, and printing of a page of image data is performed. However, the page length of a page of image probably does not completely corresponds to the color mark distance on the printing substrate, and the phenomenon that the page length of a page of image to be printed is larger than the actual color mark distance may occur. When the page length of a page of image is smaller than the actual color mark distance, a color mark signal can be naturally acquired, namely a PD signal is generated to trigger printing of a page. However, if the page length of a page of image is larger than the actual color mark distance or is several times the actual color mark distance, the acquired color mark signals need to be processed, some color mark signals results in generation of PD signals, and others do not result in generation of PD signals. Therefore, the color mark input signal processing module 25 processes all the acquired color mark signals and then outputs the processed signals to the PD signal generating sub-module 261, and this sub-module performs selection of the color mark signals, judges which color mark signals are needed to generate PD and which color mark signals are not needed to generate PD and then transmits the color mark signals which are needed to generate the PD to several other PD signal generating sub-modules. The color mark signals received by the other sub-modules are all effective color mark signals which are needed to generate the PD, so delay and PD generation are directly performed.

Similarly, for example, the color mark printing mode is adopted for the above-mentioned job 1. After the MCU circuit 3 detects that the complete data of the current page have been transmitted to the rear-end system, the PD signal generating sub-modules 261-264 start working, but generation of PD signals are not started at this moment; instead, after the PD signal generating sub-module 261 receives the 1st effective color mark signal, the PD signal of the 1st pane is generated, and the other 3 PD signal generating sub-modules 262-264 are informed that 1 PD signal has already been generated. Like in the continuous printing mode, after completing delay of the corresponding panes, the other 3 sub-modules generate PD signals for the panes thereof. After generating the PD signal, each sub-module judges whether printing of 1 page of data is completed or not also by recording the number of encoder signals. If the PD signal generating sub-module 261 receives another color mark signal in the process of printing 1 page, the color mark signal is directly discarded. The different from the continuous printing mode lies in that after determining that 1 page has already been printed (namely, the number of the encoder signals recorded from the generating moment of the PD signal of each pane is equal to 3 times the page length of 7,092 lines), the PD signal generating sub-module 261 does not immediately generate the next PD, but waits for 1 new color mark signal and generates the PD, and then informs the following three panes to perform delay and generate a new PD. Moreover, as mentioned above, the concept of page distance is not involved in the color mark printing mode. When printing of the last page of the last pane is completed, state information is generated through the MCU circuit 3 and returned to the front-end system, and this job of 100 pages has already been printed.

After the generated PD signal of each pane is transmitted to the rear-end system for printing in the step S305, whether the current page is the last page or not is judged in step S306, if so, printing is ended, otherwise, it jumps to the step S303, and the above steps are repeated to transmit and print data of the next page.

It is pointed out herein that the step S303 and the step S304 are executed in parallel, specifically, when the data is transmitted to the rear-end system, the MCU circuit 3 still continuously judges whether the memory circuit 1 has an enough space for receiving the data of the front-end system or not, and if the space is enough, the FPGA circuit 2 is simultaneously started to continuously request the front-end system for data.

If a new print job with the same page size is received in the process of printing this job, each parameter does not need to be updated due to the same size of pages, and data is directly transmitted, thus ensuring the continuity of printing. It only needs to go through the working distance required by the front-end system when the previous job is completed, and then perform printing of the next job.

The synchronous control method for continuous printing of the pages with multiple panes and the same size is already described above, and the synchronous control method for continuous printing of the pages with multiple panes and different sizes will be described below.

For example, after a job of 300 mm*500 mm is printed, a job of 250 mm*400 mm needs to be printed. At this moment, it is still 4-color printing synchronization from the perspective the whole printing flow, the difference lies in that the page size is changed in the printing process, namely the size of the next print job is completely different from the size of the previous print job, and as continuous printing is required, parameter application of the image size needs to be considered. As mentioned above, image size parameters are mainly applied in two links.

In one link, in the process that the data transmission module 23 transmits each page of image data to the rear-end system, each of the data transmission sub-modules 231-234 judges the start moment and the end moment of the page of image data in the X direction and the Y direction according to the size of each page of image. The data transmission module 23 acquires the size of each page of image through the MCU circuit 3, and the MCU circuit 3 may directly query the state of the received data, or receives parameters of a job when receiving the print start command of this job transmitted by the front-end system. A corresponding register for recording parameters of page size may be set in each data transmission sub-module. When the MCU circuit 3 starts a data transmission sub-module to transmit one-color data of a page of image to the rear-end system, the MCU circuit 3 writes the size parameters of the page to be transmitted once into this data transmission sub-module, this data transmission sub-module may write this group of parameters into the corresponding register, and the parameters are judged in the data sensing process, so that the transmission accuracy of data of the pages with different sizes is ensured.

In the other link, in the process of generating the PD signals, the PD signal generating module 26 judges whether printing of a page is completed or not and whether generation of PD signals of the next page needs to be started or not according to the number of lines of the image in the Y direction. Since each sub-module performs delay corresponding to the page length after generating one PD, and then generates the next PD, each sub-module needs to definitely know the page length size of the current page when generating one PD.

A method for setting a corresponding cache in the PD signal generating module may be adopted, the MCU circuit 3 writes the page length of each page transmitted to the rear-end system into this cache, and each PD signal generating sub-module corresponds to the same cache. In this way, when each sub-module generates a PD, a corresponding page length parameter is read from the cache, so that accurate delay after the PD is generated may be ensured.

In conclusion, the present invention has two key points: synchronization among a plurality of colors and change control of the page size in the continuous printing process. Based on multi-color synchronization, namely overprinting alignment, changes of the page size are accurately and timely controlled to ensure the accuracy and the continuity of printing.

Through the above technical solution, based on the control characteristic of real-time printing of the digital printing equipment, combination of the MCU circuit and the FPGA circuit is mainly adopted in the embodiments of the present invention, in conjunction with the peripheral memory circuit, to achieve synchronous control of printing of multiple panes, thus realizing continuous printing of pages with multiple panes and different sizes, and being good instantaneity and high in synchronous control precision. On the premise that the printing speed is ensured, the whole synchronous process and change of the page size may be achieved in the printing process, and the two ways of the continuous printing mode and the color mark printing mode are covered. Moreover, due to reasonable design of the FPGA circuit part, the consumption of hardware resources is greatly reduced, and cost is reduced. For actual industrial production, the production efficiency is effectively improved, and the waste of production media is reduced.

The present invention is described in detail above with reference to the accompanying drawings and the embodiments. However, it should be understood that the present invention is not limited to the particular embodiments disclosed above, and any variation based on the technical solution disclosed in the description should be included within the protection scope of the present invention. For example, the method for synchronization control in digital printing of the present invention may also be implemented in the form of software or in the form other hardware, and software program codes or hardware for implementation is embedded into a proper system of the digital printing equipment.

It can be appreciated by those of ordinary skill in the art that all or part of the steps involved in the method of the above-mentioned embodiment may be performed by corresponding hardware instructed by a program, the program may be stored in a computer-readable storage medium, and when the program is executed, one or a combination of the steps of the embodiment of the method is included.

In addition, in the embodiments of the present invention, the functional units may be integrated in one processing module, or the functional units may be present separately and physically, or two or more units may be integrated in one module. The above-mentioned integrated module may be implemented in the form of hardware or in the form of a software functional module. If the integrated module is implemented in the form of the software functional module and sold or used as an independent product, the integrated module may also be stored in a computer-readable storage medium.

It should be appreciated by those skilled in the art that the embodiments of the present invention may provided as methods, systems or computer program products. Therefore, the present invention may adopt the forms of complete hardware embodiments, complete software embodiments or embodiments combining software and hardware. Moreover, the present invention may adopt the form of computer program products implemented on one or more computer-available storage media (including but not limited to a disk memory, an optimal memory and the like) containing computer usable program codes.

The present invention is described with reference to flow diagrams and/or block diagrams of the method, the equipment (system) and the computer program products according to the embodiments of the present invention. It should be understood that each flow and/or block in the flow diagrams and/or block diagrams and combination of flows and/or blocks in the flow diagrams and/or block diagrams may be implemented by computer program instructions. These computer program instructions may be supplied to a general-purpose computer, a special-purpose computer, an embedded processor or a processor of other programmable data processing equipment to produce a machine, so that a device for realizing functions specified in one or more flows of the flow diagrams and/or one or more blocks of the block diagrams is produced through instructions executed by the computer or the processor of other programmable data processing equipment.

These computer program instructions may also be stored in a computer-readable memory capable of guiding the computer or other programmable data processing equipment to work in a specific mode, so that a manufactured product containing an instruction device is produced through the instructions stored in the computer-readable memory, and the instruction device implements the functions specified in one or more flows of the flow diagrams and/or one or more blocks of the block diagrams.

These computer program instructions may also be loaded to the computer or other programmable data processing equipment, so that a series of operation steps are executed in the computer or other programmable data processing equipment to produce processing implemented by the computer, and the steps for implementing the functions specified in one or more flows of the flow diagrams and/or one or more blocks of the block diagrams are provided through the instructions executed in the computer or other programmable data processing equipment provide.

Apparently, various alterations and modifications may be made to the present invention by those skilled in the art without departing from the spirit and scope of the present invention. Thus, if these alterations and modifications of the present invention fall into the scope of claims of the present invention and equivalent technologies thereof, the present invention is also intended to include these alterations and modifications.

The invention claimed is:

1. A device for synchronization control in digital printing, comprising:
 a storage unit, configured to store data of a pane;
 a control unit, configured to control an interactive processing unit to execute reception, storage and transmission of the data and generation of print triggering signal; and
 the interactive processing unit, configured to, under control of the control unit, receive the data of a pane from a front-end system of digital printing equipment, store the received data in the storage unit, transmit the stored data to a rear-end system of the digital printing equipment, generate the print triggering signal of a pane according to signal of an encoder and/or a color mark sensor as peripheral device of the digital printing equipment and transmit the print triggering signal to the rear-end system of the digital printing equipment, wherein the encoder provides encoder signals that are unit triggering signals for printing one line data by the digital printing equipment; the color mark sensor provides color mark signals, once an effective color mark signal is received, it is considered that printing of a new page is needed.

2. The device of claim 1, wherein the control unit is further configured to perform control by:

analyzing command and parameter received by a receiving module, and transmitting the analyzed print job parameter, equipment parameter and pane parameter to the interactive processing unit;

in response to a print start command, allocating a storage space for a pane in the storage unit according to the quantity of panes;

when detecting that the storage space allocated for the pane in the storage unit is idle, starting the interactive processing unit to receive data of the pane from the front-end system page by page and store the data in the storage space corresponding to the pane in the storage unit;

when detecting that a complete page of data is stored in the storage unit, starting the interactive processing unit to determine a start moment and an end moment of transmitting the data of the pane of the complete page according to the print job parameter and the equipment parameter analyzed by the control unit, and transmit the data of the pane of the complete page stored in the storage unit to the rear-end system of the digital printing equipment according to the determined start moment and end moment; and after detecting that the complete page of data has been transmitted to the rear-end system, starting the interactive processing unit to generate a print triggering signal of the pane according to the print job parameter, the equipment parameter and the pane parameter analyzed by the control unit and transmit the print triggering signal to the rear-end system of the digital printing equipment.

3. The device of claim 2, wherein the interactive processing unit comprises:

a receiving module, configured to receive print command, pane parameter, equipment parameter and print job parameter from the front-end system and transmit received command and parameter to the control unit for analysis, wherein the print command comprises a print start command and a print cancel command, the pane parameter comprises a physical distance of a pane from a 1st pane, the equipment parameter comprises a maximal printing effective width of the digital printing equipment, and the print job parameter comprises quantity of panes required to be configured in a print job, page length, page width and number of pages of the print job, space between adjoining pages in the print job and space between adjoining print jobs; when detecting that the storage space allocated for a pane in the storage unit is idle, the receiving module is configured to receive the data of the pane from the front-end system page by page, and store the received data in the storage space, corresponding to the pane, of the storage unit according to timing control;

a data transmission module, configured to, when the control unit detects that a complete page of data is stored in the storage unit, determine a start moment and an end moment of transmitting the data of the pane of the complete page according to the print job parameter and the equipment parameter analyzed by the control unit, and transmit the data of the pane of the complete page stored in the storage unit to the rear-end system of the digital printing equipment according to the determined start moment and end moment;

an encoder input signal processing module and/or a color mark input signal processing module, wherein the encoder input signal processing module is configured to perform filtration, frequency division and frequency multiplication on encoder signal input through the encoder, and the color mark input signal processing module is configured to filter color mark signal input through the color mark sensor; and a print triggering signal generating module, configured to, when the control unit detects that the complete page of data has been transmitted to the rear-end system, generate a print triggering signal of the pane according to the signal processed by the encoder input signal processing module and/or the color mark input signal processing module and the print job parameter, the equipment parameter and the pane parameter analyzed by the control unit.

4. The device of claim 3, wherein the print triggering signal generating module is further configured to generate the print triggering signal of the pane page by page by:

when the control unit detects that complete data of the current page has been transmitted to the rear-end system, generating the print triggering signal of the 1st pane;

recording the number of encoder signals from the generating moment of the print triggering signal of the 1st pane, and when the number of delay lines corresponding to the recorded number of the encoder signals is identical to the number of lines corresponding to the physical distance of any of the remaining panes from the 1st pane, generating the print triggering signal of the pane;

recording the number of encoder signals from the generating moment of the print triggering signal of the pane, and when the number of delay lines corresponding to the recorded number of the encoder signals is identical to the number of lines corresponding to the sum of the page length and the space between adjoining pages, executing the above-mentioned steps again to generate the print triggering signal of the pane of the next page.

5. The device of claim 3, wherein the print triggering signal generating module is further configured to generate the print triggering signal of the pane page by page by after the control unit detects that complete data of the current page has been transmitted to the rear-end system and a 1st effective color mark signal is received, generating the print triggering signal of the 1st pane;

recording the number of encoder signals from the generating moment of the print triggering signal of the 1st pane, and when the number of lines corresponding to the recorded number of the encoder signals is identical to the number of lines corresponding to the physical distance of any of the remaining panes from the 1st pane, generating the print triggering signal of this pane;

recording the number of encoder signals from the generating moment of the print triggering signal of the pane, and when the number of delay lines corresponding to the recorded number of the encoder signals is identical to the number of lines corresponding to the page length, executing the above-mentioned steps again to generate the print triggering signal of the pane of the next page.

6. The device of any of claims 1-5, wherein the control unit is further configured to be implemented by a micro-control unit, the interactive processing unit is further configured to be realized by a field programmable gate array circuit, and the storage unit is implemented by a memory circuit.

7. A method for synchronization control in digital printing, comprising:

analyzing print command, pane parameter, equipment parameter and print job parameter received from a front-end system of digital printing equipment, wherein the print command comprises a print start command and a print cancel command, the pane parameter comprises a physical distance of a pane from a 1st pane, the equipment parameter comprises a maximal printing effective width of the digital printing equipment, and the print job parameter comprises quantity of panes required to be configured in a print job, page length, page width and number of pages of the print job, space between adjoining pages in the print job and space between adjoining print jobs;

in response to the print start command, allocating a storage space for the pane according to the quantity of panes;

when detecting that the storage space allocated for the pane is idle, receiving data of the pane from the front-end system page by page and storing the data in the corresponding storage space;

when detecting that a page of complete data is stored, determining a start moment and an end moment of transmitting the data of the pane of the page according to the analyzed print job parameter and equipment parameter, and transmitting the stored data of the pane of the page to a rear-end system of the digital printing equipment according to the determined start moment and end moment; and after detecting that a page of data has been transmitted to the rear-end system, generating a print triggering signal of the pane according to signals of an encoder and/or a color mark sensor as peripheral device of the digital printing equipment and the analyzed print job parameter, equipment parameter and pane parameter, and transmitting the print triggering signals to the rear-end system of the digital printing equipment.

8. The method of claim 7, further comprising:

performing filtration, frequency division and frequency multiplication on encoder signals input through the encoder, filtering color mark signals input through the color mark sensor, to obtaining effective encoder signals from which burrs are eliminated.

9. The method of claim 7, generating the print triggering signal of the pane page by page comprising:

when detecting that complete data of the current page has been transmitted to the rear-end system, generating the print triggering signal of the 1st pane;

recording the number of encoder signals from the generating moment of the print triggering signal of the 1st pane, and when the number of delay lines corresponding to the recorded number of the encoder signals is identical to number of lines corresponding to the physical distance of any of the remaining panes from the 1st pane, generating the print triggering signal of the pane;

recording the number of encoder signals from the generating moment of the print triggering signal of the pane, and when the number of delay lines corresponding to the recorded number of the encoder signals is identical to the number of lines corresponding to the sum of the page length and the space between adjoining pages, executing the above-mentioned steps again to generate the print triggering signal of the pane of the next page.

10. The method of claim 7, generating the print triggering signal of the pane page by page comprising:

after detecting that complete data of the current page has been transmitted to the rear-end system and receiving a 1st effective color mark signal, generating the print triggering signal of the 1st pane;

recording the number of encoder signals from the generating moment of the print triggering signal of the 1st pane, and when the number of delay lines corresponding to the recorded number of the encoder signals is identical to the number of lines corresponding to the physical distance of any of the remaining panes from the 1st pane, generating the print triggering signal of this pane; and recording the number of encoder signals from the generating moment of the print triggering signal of the pane, and when the number of delay lines corresponding to the recorded number of the encoder signals is identical to the number of lines corresponding to the page length, executing the above-mentioned steps again to generate the print triggering signal of the pane of the next page.

\* \* \* \* \*